(12) United States Patent
Booth et al.

(10) Patent No.: US 8,268,375 B2
(45) Date of Patent: Sep. 18, 2012

(54) METHOD FOR IMPRINTING PATTERNS ON AN EXTRUDED PRODUCT

(75) Inventors: John Booth, Cheshire (GB); James M. Whitham, Cheshire (GB)

(73) Assignee: Kellogg Company, Battle Creek, MI (US)

( * ) Notice: Subject to any disclaimer, the term of this patent is extended or adjusted under 35 U.S.C. 154(b) by 652 days.

(21) Appl. No.: 11/861,653

(22) Filed: Sep. 26, 2007

(65) Prior Publication Data
US 2008/0014309 A1    Jan. 17, 2008

Related U.S. Application Data

(62) Division of application No. 11/035,571, filed on Jan. 14, 2005, now Pat. No. 7,302,909.

(60) Provisional application No. 60/536,620, filed on Jan. 15, 2004.

(51) Int. Cl.
*A23L 1/00* (2006.01)

(52) U.S. Cl. ........ 426/302; 426/249; 426/303; 426/304; 426/383

(58) Field of Classification Search .......... 426/302–304, 426/87, 249–250, 297, 306, 307, 383, 514, 426/516, 518; 118/13, 24, 314, 316; 239/434, 239/434.5
See application file for complete search history.

(56) References Cited

U.S. PATENT DOCUMENTS

| | | | | |
|---|---|---|---|---|
| 2,246,871 | A | * | 6/1941 | Balch ............................ 426/249 |
| 4,368,684 | A | * | 1/1983 | Launay ........................... 118/25 |
| 4,640,219 | A | * | 2/1987 | Anderson et al. ............... 118/24 |
| 4,751,878 | A | * | 6/1988 | Lopes ........................... 99/450.1 |
| 5,305,955 | A | * | 4/1994 | Smitherman et al. ........... 239/75 |
| 5,480,664 | A | * | 1/1996 | Ferrero ......................... 426/307 |
| 6,340,488 | B1 | * | 1/2002 | French et al. ................. 426/302 |

OTHER PUBLICATIONS

Dictionary.com. Channel. Retrieved Mar. 16, 2010 from: http://dictionary.reference.com/browse/channel.*

* cited by examiner

*Primary Examiner* — Drew Becker
*Assistant Examiner* — Luana Z Long
(74) *Attorney, Agent, or Firm* — Dickinson Wright PLLC

(57) ABSTRACT

A method for spraying a food product is disclosed herein. The method includes the step of disposing a first sprayer along an axis defining, at least in part, a path of movement for a food product. The method also includes the step of disposing a second sprayer along the axis axially and radially spaced from the first sprayer. The method also includes the step of directly communicating with the first and second sprayers disposed along the axis with a cavity operable to receive edible ink such that the first and second sprayers concurrently spray the edible ink to the axis.

19 Claims, 7 Drawing Sheets

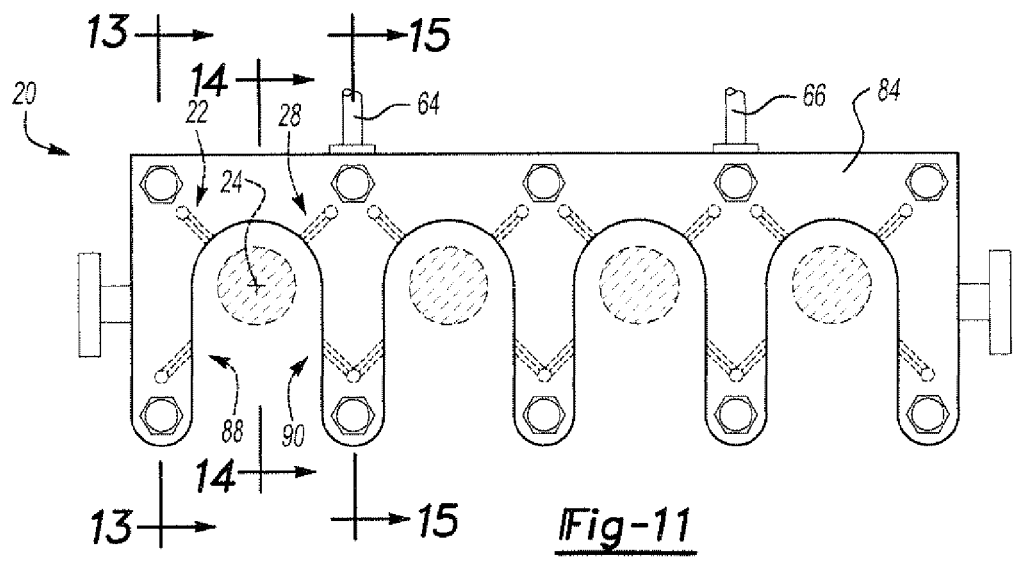
Fig-11
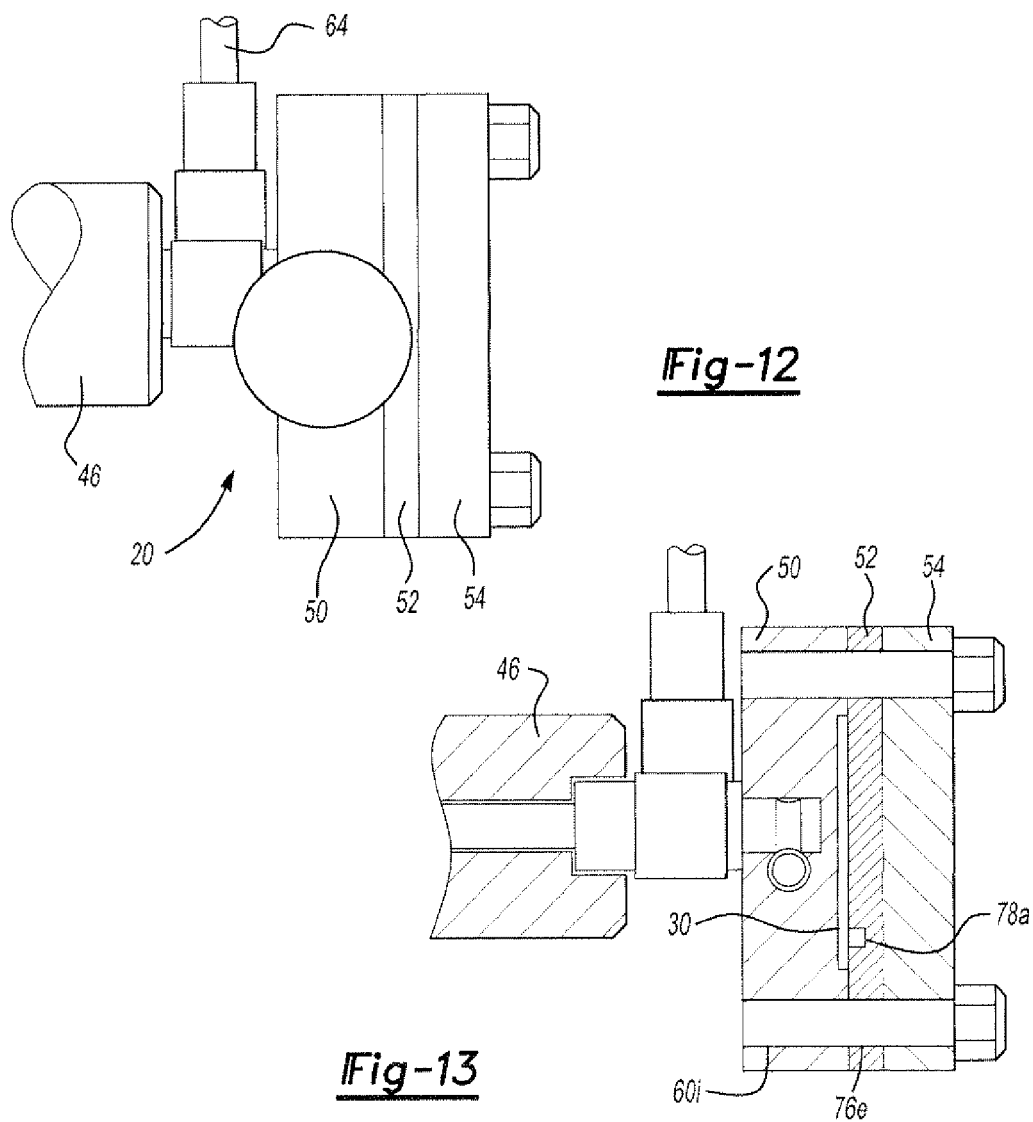
Fig-12
Fig-13

METHOD FOR IMPRINTING PATTERNS ON AN EXTRUDED PRODUCT

CROSS REFERENCE TO RELATED APPLICATIONS

This application is a divisional application of Ser. No. 11/035,571 for NOZZLE ASSEMBLY FOR IMPRINTING PATTERNS ON AN EXTRUDED PRODUCT, filed on Jan. 14, 2005, now U.S. Pat. No. 7,302,909 and further claims the benefit of U.S. Provisional Patent Application Ser. No. 60/536,620 for a NOZZLE ASSEMBLY FOR IMPRINTING PATTERNS ON AN EXTRUDED PRODUCT, filed on Jan. 15, 2004, which is hereby incorporated by reference in its entirety.

TECHNICAL FIELD

The invention relates to a nozzle assembly for imprinting patterns on food products with edible ink.

BACKGROUND OF THE INVENTION

Food products can be sprayed with edible ink to enhance the appearance or taste of the food product. For example, the sprayed material can be a different color than the food product so that the resulting food product has a visually stimulating appearance. For example, stripes can be sprayed on a food product. In another example, the sprayed material can taste differently than the food product so that the resulting food product has a combination of flavors.

SUMMARY OF THE INVENTION

In summary, the invention is a method for spraying a food product. The method includes the step of disposing a first sprayer along an axis defining, at least in part, a path of movement for a food product. The method also includes the step of disposing a second sprayer along the axis axially and radially spaced from the first sprayer. The method also includes the step of directly communicating with the first and second sprayers disposed along the axis with a cavity operable to receive edible ink such that the first and second sprayers concurrently spray the edible ink to the axis.

BRIEF DESCRIPTION OF THE DRAWINGS

Advantages of the present invention will be readily appreciated as the same becomes better understood by reference to the following detailed description when considered in connection with the accompanying drawings wherein:

FIG. 11 is a front view of the assembled nozzle assembly of the exemplary embodiment of the invention;

FIG. 12 is a partial left hand view of the nozzle assembly shown in FIG. 11;

FIG. 13 is a cross-sectional view taken along section lines 13-13 in FIG. 11;

DETAILED DESCRIPTION OF THE PREFERRED EMBODIMENT

Figure 1:
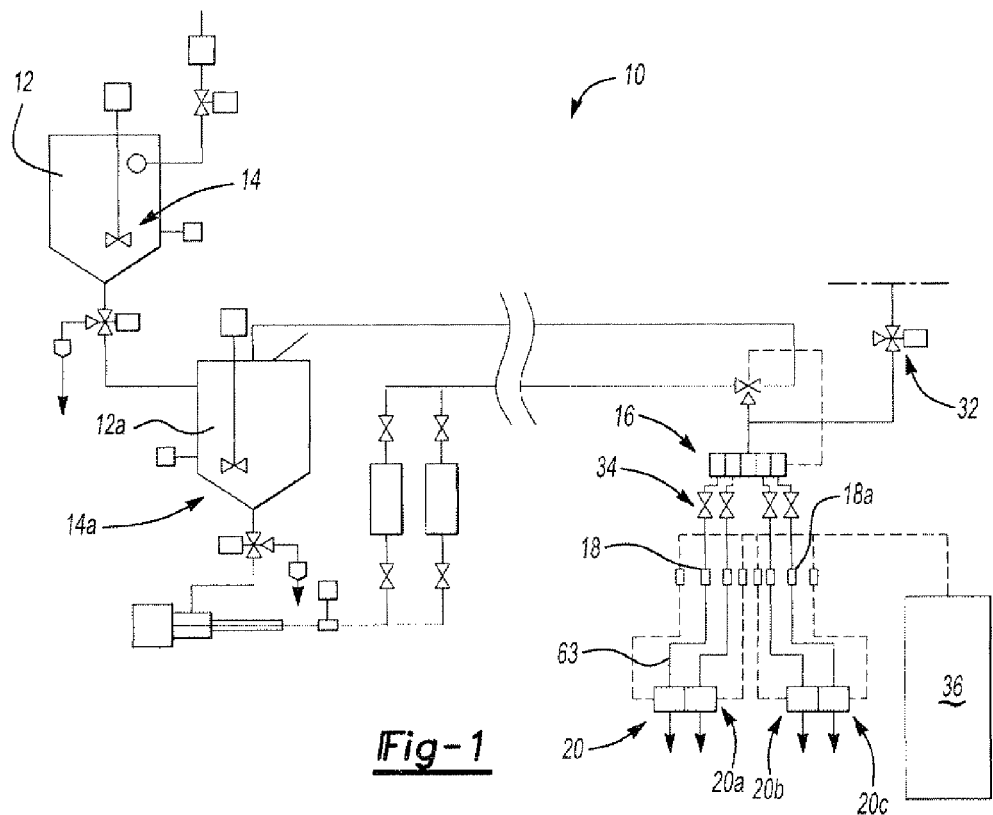
FIG. 1 is a schematic view of an exemplary ink supply system for supplying ink to the exemplary embodiment of the invention.

Referring now to FIG. 1, wherein like numerals indicate like or corresponding parts throughout the several views, an ink supply system is schematically shown at 10 in FIG. 1. The ink supply system 10 can include one or more tanks 12, 12a each having one or more agitators 14, 14a that feed edible ink, such as yogurt, chocolate, caramel, frosting and the like, to a manifold 16. The edible ink could also contain vitamins, colors, flavorings, and the like. The edible ink then moves through a series of quick release couplings, such as couplings 18, 18a into one or more nozzle assemblies 20, 20a, 20b, 20c. In the exemplary embodiment of the invention, the nozzle assemblies 20, 20a, 20b, 20c are constructed similarly with respect to one another. Therefore, operation and construction of the nozzle assembly 20 describe below is applicable to the nozzle assemblies 20a, 20b, 20c.

Referring now to FIG. 11, the nozzle assembly 20 includes a first sprayer 22 disposed along an axis 24 defining, at least in part, a path of movement for a food product 26. The nozzle assembly 20 also includes a second sprayer 28 disposed along the axis 24. The second sprayer 28 is axially and radially spaced from the first sprayer 22.

Figure 5:
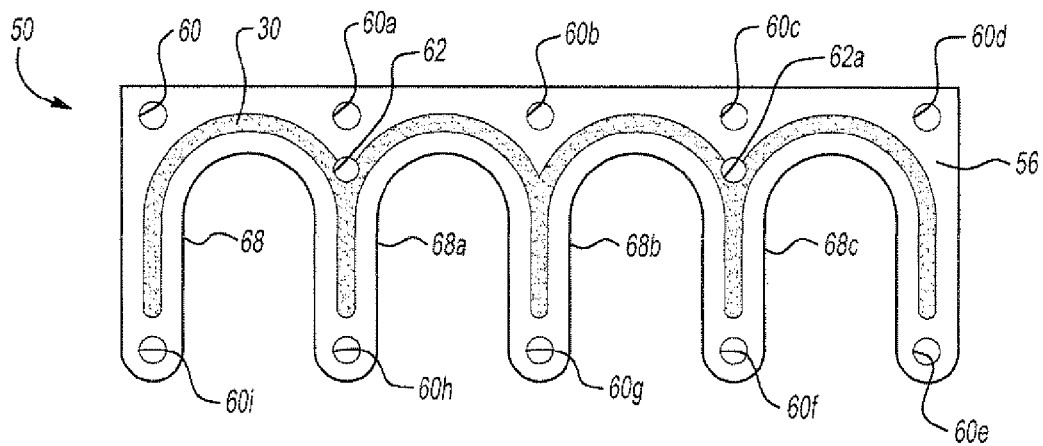
FIG. 5 is a front view of a first plate, or distribution plate, according to the exemplary embodiment of the invention.
Figure 6:
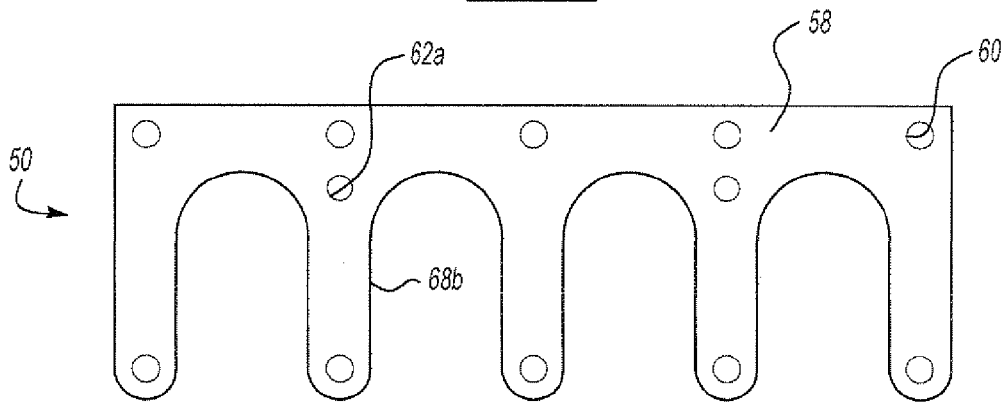
FIG. 6 is a rear view of the distribution plate shown in FIG. 5.
Figure 7:
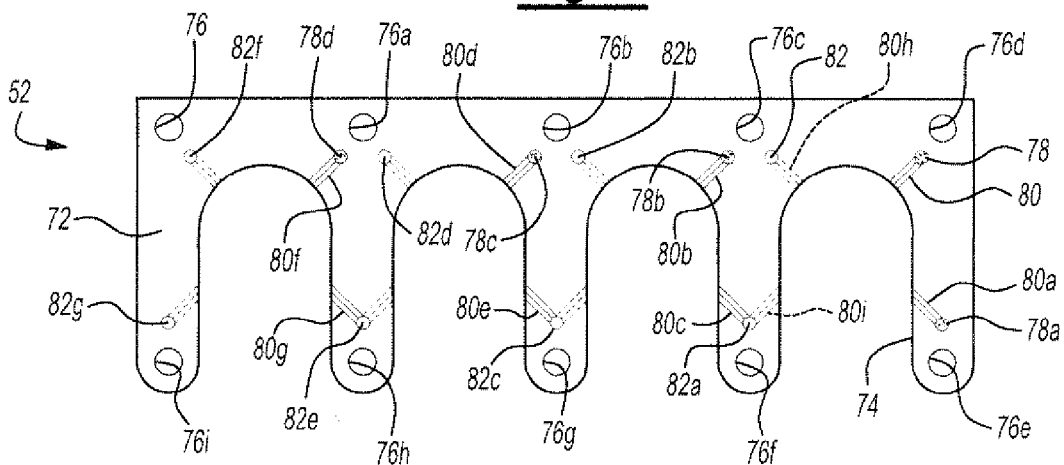
FIG. 7 is a rear view of a second plate, or die plate, according to the exemplary embodiment of the invention.

Referring now to FIG. 5, the nozzle assembly 20 also includes a cavity 30 operable to receive edible ink. The cavity communicates directly with the first and second sprayers 22, 28 disposed along the axis 24. The first and second sprayers 22, 28 concurrently spray the edible ink from the cavity 30 to the axis 24.

Referring again to FIG. 1, there are four nozzle assemblies 20, 20a, 20b, 20c in the exemplary embodiment of the invention. It should be appreciated that there may be any number of nozzle assemblies formed into a single series of nozzle assemblies or formed and mounted independently of each other.

A hot water supply 32 can be fed into the manifold 16 such that the equipment in the ink supply system 10 can be flushed of the edible ink. It should be appreciated that the ink supply system 10 can include any appropriate number of pressure control valves, pressure switches, drains, probes, meters, pumps and any other component of a fluid delivery system. It should also be appreciated that the ink supply system 10 can be of any suitable design for providing the edible ink to the nozzle assembly 20.

A solenoid valve 34 is disposed up stream of the nozzle assembly 20. Solenoid valves can also be disposed upstream of each of the nozzle assemblies 20a, 20b, 20c. The solenoid valve 34 is operable in an open configuration to allow passage of edible ink between the ink supply system 10 and the cavity 30 of the nozzle assembly. The solenoid valve 34 is also operable in a closed configuration to prevent passage of edible ink between the ink supply system 10 and the cavity 30 of the nozzle assembly. When the solenoid valve 34 is in the open configuration, edible ink is sprayed from the first and second sprayers 22, 28. When the solenoid valve 34 is in the closed configuration, edible ink is not sprayed from the first and second sprayers 22, 28. The solenoid valve 34 is controlled to change between the open and closed configurations by a controller 36.

Figure 2:
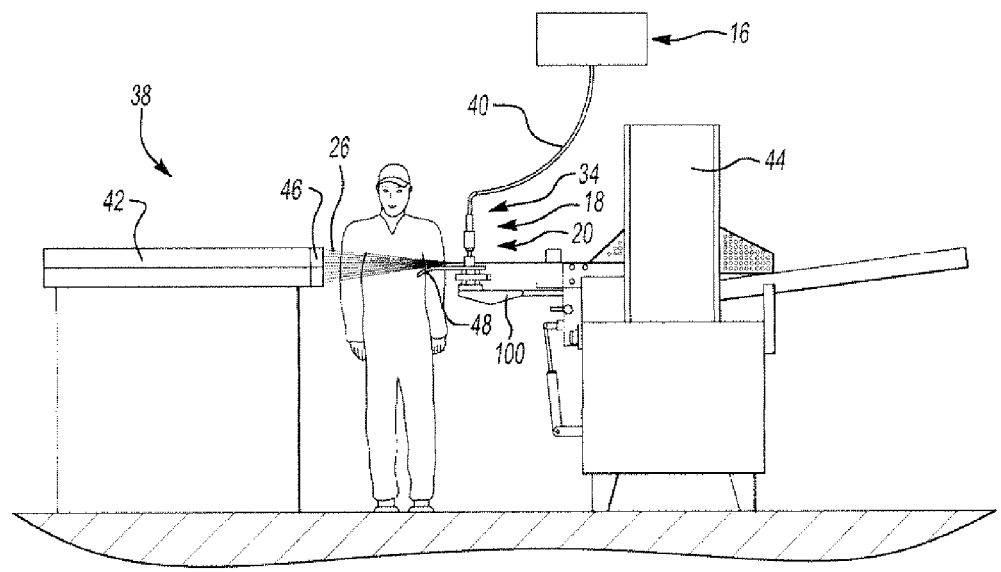
FIG. 2 is a front view of a food processing unit having incorporating the exemplary embodiment of the invention.
Figure 3:
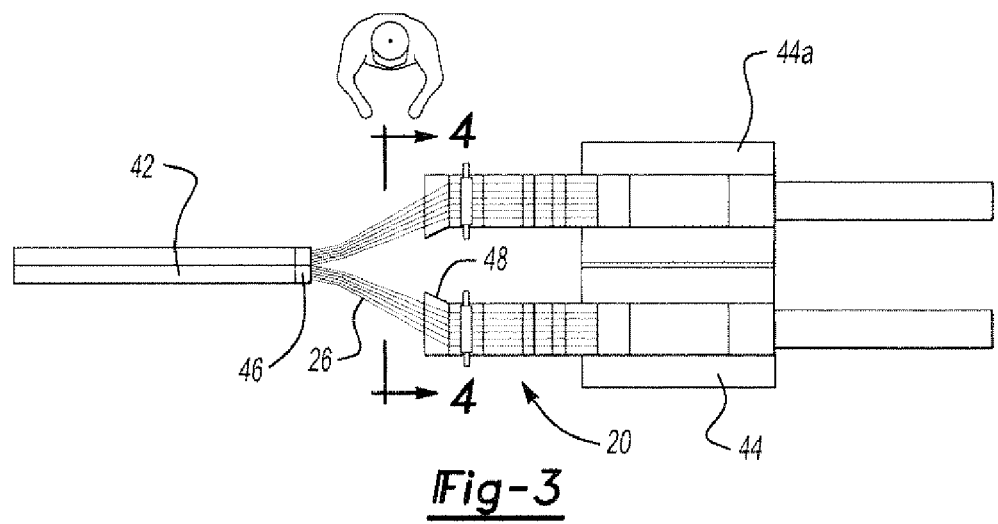
FIG. 3 is a top view of the food processing unit.
Figure 4:
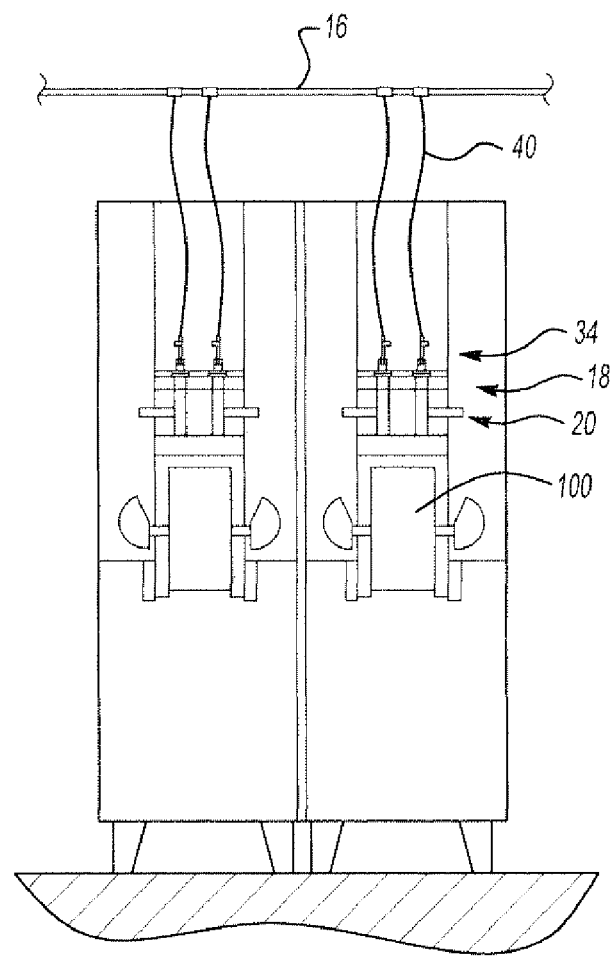
FIG. 4 is section view taken along section lines 4-4 in FIG. 3.

Referring now to FIGS. 2-4, a food processing unit 38 is generally shown. The food processing unit 38 is connected to the manifold 16 of the ink supply system 10 through the quick release couplings and corresponding flexible hoses, such as hose 40. The food processing unit 38 includes one or more extruders 42, 42a and a forming devices 44, 44a. The nozzle assembly 20 is supported in position by the food processing unit 38, between an outlet port 46 of the extruder 42 and the forming device 44. The extruders 42, 42a can include any number of extruder ports. The extruder port 46 is spaced a predetermined distance from the nozzle assembly 20. There may be one or more extruder ports associated with the nozzle assemblies 20. It should be appreciated that the extruders 42, 42a can be of any suitable type known to those skilled in the art, such as a standard extruder or a co-extruder as well as a hot or cold extruder. The forming device 44 is spaced from the nozzle assembly 20 and includes a conveyor for supporting the extruded food product 26. The forming device 44 can include any suitable number of components, such as flatteners, crimpers, and cutters as is known in the art.

A guide 48 is disposed between the extruder outlet port 46 and the nozzle assembly 20 for guiding the food product 26 exiting the extruder 42 into the nozzle assembly 20. The spacing between the extruder port 46 and the nozzle assembly 20 allows the food product 26 to stabilize and for the guide 48 to accurately position the extruded food product 26 relative to the nozzle assembly 20. The spacing also allows the use of a radial arrangement of extruder ports in addition to a parallel arrangement of extruder ports shown best in FIG. 3.

The food product 26 is previously mixed and fed into the extruders 42, 42a as is known in the art. The food product 26 is preferably a grain product, but can be a fruit product, vegetable product, or any other suitable food product that is capable of passing through an extruder. The extruder port 46 discharges the food product 26 at a relatively high velocity to form a continuous rope. The food product 26 can be of any suitable cross-section and of the type that expands upon discharge from the extruder port 46, but can also be of the type that does not expand. In the preferred embodiment, the guide 48 will accurately guide the rope of extruded food product 26 into the nozzle assembly 20 of the exemplary embodiment of the invention. As set forth above, the nature of the food product and the arrangement configured to move the food product to the inventive nozzle assembly can be varied as desired.

Referring now to FIGS. 5-15, the nozzle assembly 20 of the exemplary embodiment of the invention includes a first plate 50, or distribution plate 50, a second plate 52, or die plate 52, and a third plate 54, or end plate 54, stacked with respect to one another. (In FIGS. 12-15, the relative position of the extruder port 46 to the nozzle assembly 20 is exaggerated for illustrative purposes. As discussed above, the extruder port 46 is spaced from the nozzle assembly 20 by a larger predetermined distance.) The distribution plate 50 includes a first front surface 56, a first rear surface 58, and a plurality of apertures 60-60i. The cavity 30 is recessed from the front surface 56. The apertures 60-60i receive bolts that connect the plates 50, 52, 54 together. The distribution plate also includes apertures 62, 62a that extend between the rear surface 58 to the cavity 30. Edible ink is communicated through the apertures 62, 62a to the cavity 30. As best shown schematically in FIG. 1, a fluid line 63 extends between the solenoid valve 34 and the apertures 62, 62a. As best shown in FIG. 11, the fluid line 63 includes branches 64, 66 which engage apertures 62, 62a, respectively.

The distribution plate 50 also includes a first channel 68. The first channel 68 is open to the axis 24, best shown in FIGS. 11 and 14. The food product 26 moves along the axis 24, through the first channel 68 to be sprayed by the first and second sprayers 22, 28. The distribution plate 50 can also include other channels 68a, 68b, 68c which are structured similarly and share similar function as the channel 68.

The die plate 52 includes a second front surface 70, a second rear surface 72, and a second channel 74. The die plate 52 also includes apertures 76-76i to receive bolts that connect the plates 50, 52, 54 together. The second rear surface 72 contacts the surface 56 of the distribution plate 50 to substantially seal the cavity 30. The channel 74 aligns with the channel 68.

The die plate 52 also includes a blind aperture 78 communicating with the cavity 30. The die plate 52 includes other blind apertures 78a-78d also communicating with cavity 30. The blind apertures 78-78d extend from the rear surface 72 toward the front surface 70.

Figure 8:
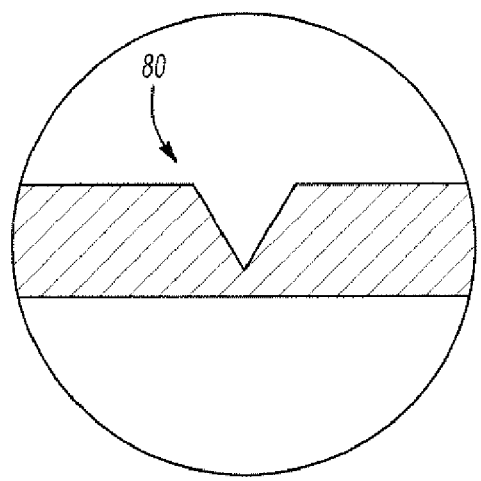
FIG. 8 is a detail view showing the cross-section of a groove formed on the dies plate.
Figure 9:
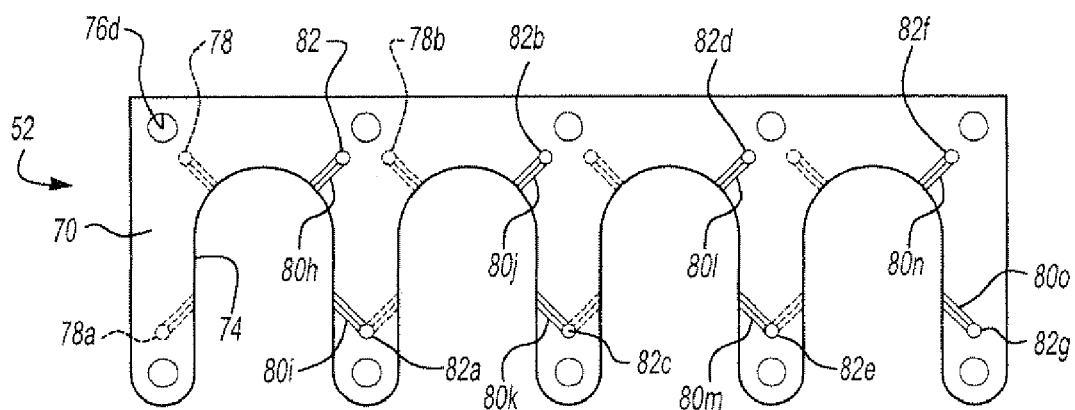
FIG. 9 is a front view of the die plate shown in FIG. 7.
Figure 10:
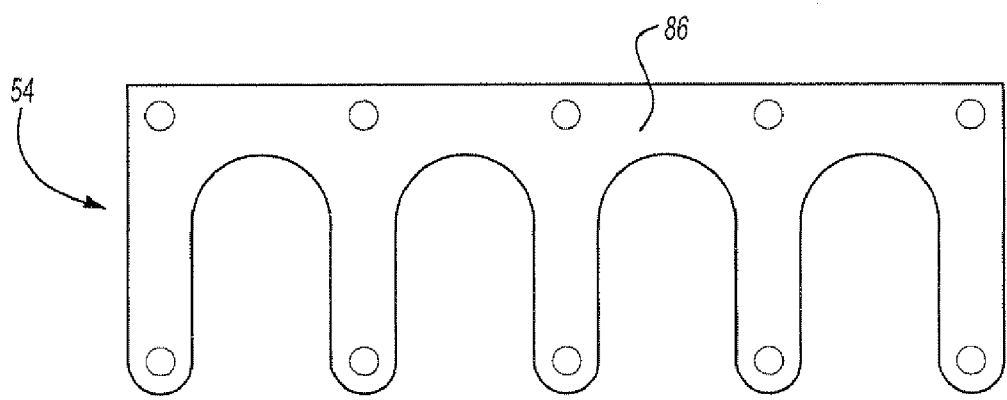
FIG. 10 is a rear view of a third plate, or end plate, according to the exemplary embodiment of the invention.
Figure 14:
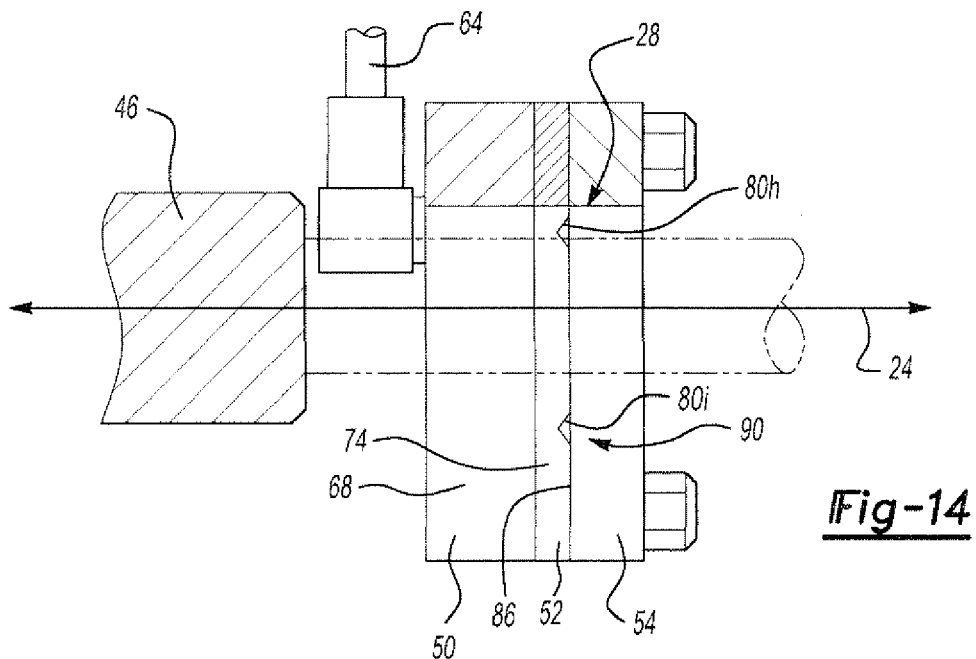
FIG. 14 is a cross-sectional view taken along section lines 14-14 in FIG. 11.
Figure 15:
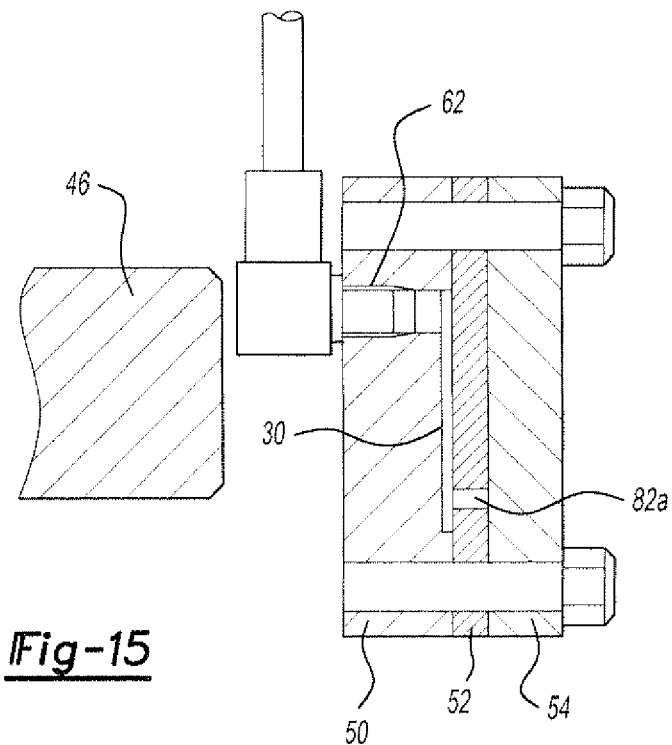
FIG. 15 is a cross-sectional view taken along section lines 14-14 in FIG. 11.

The die plate 52 also includes a plurality of grooves 80-80g recessed from the rear surface 72 and a plurality of grooves 80h-80o recessed from the front surface 70. FIG. 8 is a detail view of the groove 80; all of the grooves 80-80o are similarly structured. The grooves 80, 80a, 80b, 80d, 80f communicate with the blind apertures 78, 78a, 78b, 78c, 78d, respectively. When the solenoid valve 34 is in the open configuration, edible ink moves from the cavity 30, through the blind apertures 78-78d, and through the grooves 80, 80a, 80b, 80d, 80f to coat a food product. Cooperation between the groove 80 and the front surface 56 defines the first sprayer 22. When the solenoid valve 34 is in the open configuration, edible ink moves from the cavity 30, through the blind aperture 78, and through the groove 80 to coat the food product 26.

The die plate 52 also includes apertures 82-82g extending between the front and rear surfaces 70, 72. The groove 80h communicates with the aperture 82. When the solenoid valve 34 is in the open configuration, edible moves through the cavity 30, through the aperture 82, and through groove 80h to coat the food product 26. The end plate 54 includes a third front surface 84 and a third rear surface 86. Cooperation between the groove 80h and the rear surface 86 defines the second sprayer 28.

The groove 80a communicates with the blind aperture 78a and cooperates with the front surface 56 to define a third sprayer 88 (shown in FIG. 11). The groove 80i communicates with the aperture 82a and cooperates with the front surface 56 to define a fourth sprayer 90 (shown in FIG. 11). When the solenoid valve 34 is in the open configuration, edible ink is concurrently sprayed on the food product 26 through the sprayers 22, 28, 88, 90.

The arrangement of the channel 74 and sprayers 22, 28, 88, 90 is repeated in the adjacent channels of the nozzle assembly 20 of the exemplary embodiment of the invention. For example, relative to the rear surface 72 of the die plate 52, the groove 80b communicates with the blind aperture 78b and cooperates with the surface 56 to define a sprayer. The groove 80c communicates with the aperture 82a and cooperates with the surface 56 to define a sprayer. The groove 80d communicates with the blind aperture 78c and cooperates with the surface 56 to define a sprayer. The groove 80f communicates with the blind aperture 78d and cooperates with the surface 56 to define a sprayer. The groove 80e communicates with the aperture 82c and cooperates with the surface 56 to define a sprayer. The groove 80g communicates with the aperture 82e and cooperates with the surface 56 to define a sprayer.

With respect to the front surface 70 of the die plate 52, the groove 80k communicates with the aperture 82c and cooperates with the surface 86 to define a sprayer. The groove 80j communicates with the aperture 82b and cooperates with the surface 86 to define a sprayer. The groove 80m communicates with the aperture 82e and cooperates with the surface 86 to define a sprayer. The groove 80l communicates with the aperture 82d and cooperates with the surface 86 to define a sprayer. The groove 80n communicates with the aperture 82f and cooperates with the surface 86 to define a sprayer. The groove 80o communicates with the aperture 82g and cooperates with the surface 86 to define a sprayer.

The edible ink is preferably of a different color than the food product 26. The edible ink can be sprayed through the nozzle assembly 20 onto the ropes in a continuous or an interrupted manner and in a variety of patterns including lines, shapes, letters, etc. The edible ink is then dried onto the food product 26. The ropes are generally flattened, but can be crimped or shaped into different forms, in the forming device 44. A predetermined distance should be maintained between the nozzle assembly 20 and the forming device 44 to allow the applied edible ink on the rope of the extruded food product 26 to properly dry before the food product 26 is crimped or flattened. Also, the nozzle assembly 20 should be adjustable relative to the ropes of extruded food product 26 in order to maintain a proper distance between the nozzle assembly 20 and the ropes. The continuous ropes are finally cut into bite-size pieces, cooled, and packaged as is known in the art. Alternatively, the continuous ropes could be cut into snack bar lengths as is known in the art.

Figure 16:
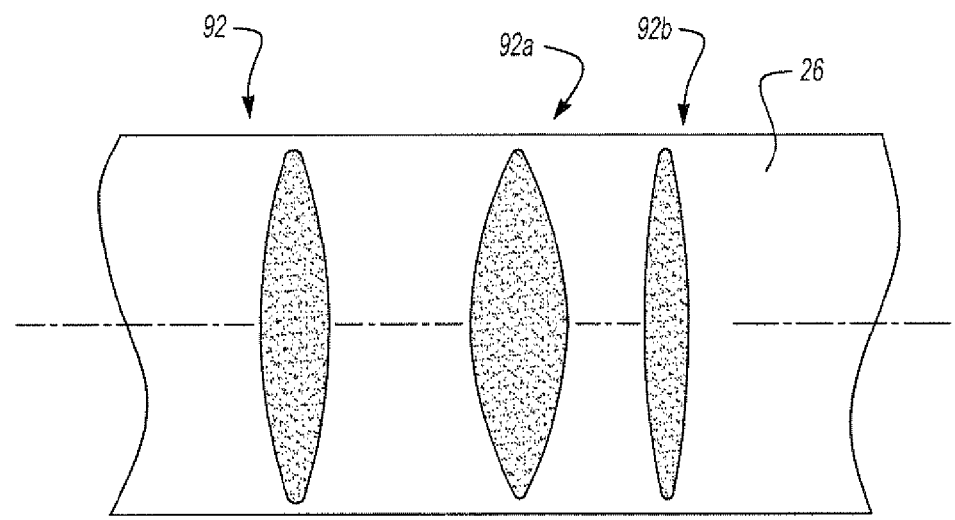
FIG. 16 is side view of a portion of food product sprayed with edible ink by the exemplary embodiment of the invention.
Figure 17:
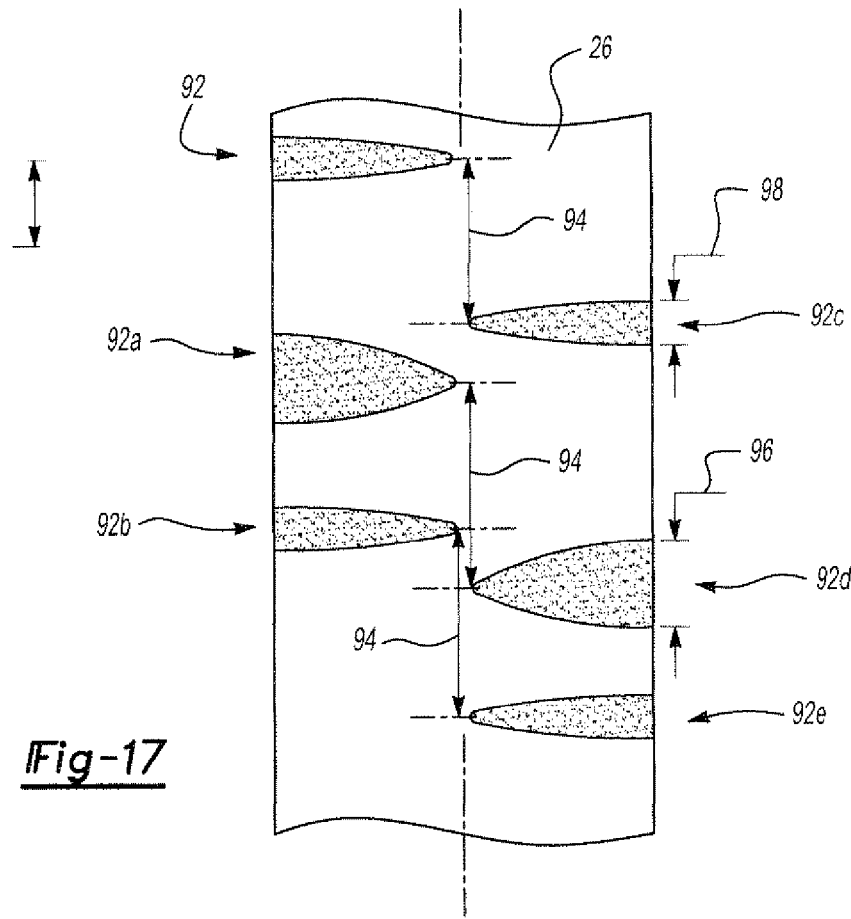
FIG. 17 is a top view of the portion shown in FIG. 16.

One contemplated food product 26 is an orange-colored, directly expanded cereal piece that may or may not have a filling. The contemplated edible ink is an ammonia caramel solution in water that is applied at ambient temperature. Alternatively, the edible ink could be applied at an elevated temperature. The final food product 26 has the appearance of an orange cereal piece with tiger stripes disposed thereon, as best shown in FIGS. 16-17. Stripes 92, 92a, 92b were produced from edible ink sprayed by the first and third sprayers 22, 88 and the stripes 92c, 92d, 92e were produced from edible ink sprayed by the second and fourth sprayers 28, 90. Stripes 92 and 92c were sprayed concurrently, stripes 92a and 92d were sprayed concurrently, and stripes 92b and 92e were sprayed concurrently. The distance 94 between stripes on opposite sides of the food product 26 corresponds to the thickness of the die plate 52.

The stripes 92-92e are thicker in the middle and taper at the ends because, in the exemplary embodiment of the invention, axially adjacent sprayers such as the first and third sprayers 22, 88 and the second and fourth sprayers 28, 90, are directed to the same position along the axis. It is noted that the first and third sprayers 22, 88 are directed to a first position along the axis 24, the second and fourth sprayers 28, 90 are directed to a second position along the axis 24, and the first and second positions are spaced from one another along the axis 24.

The solenoid valve 34 can be controlled by the controller 36 to vary the distance between stripes. For example, the distance between stripes 92, 92c and the stripes 92a, 92d is greater than the distance between the stripes 92a, 92d and the stripes 92b, 92e. The solenoid valve 34 can be opened and closed in to produce an apparently random pattern of stripes on the food product 26. The opening and closing of the solenoid valve 34 can correspond to the rate at which the food product 26 moves along the axis 24 or be controlled independent of the rate at which the food product 26 moves along the axis 24.

Also, the solenoid valve 34 can be controlled by the controller 36 to vary the thickness of pairs of stripes. For example, the thickness 96 of a pair of strips 92a, 92d is greater than the thickness 98 of the pair of stripes 92, 92c. Thickness can be varied by increasing the time that the solenoid valve 34 is in the open configuration.

As an additional feature, optical sensors (not shown) can be incorporated near the extruder ports 46 and/or the nozzle assembly 20 to monitor the exiting of the food product 26 to ensure that the ropes are continuously exiting the corresponding extruder ports 46. In the event that a rope is not present, the nozzle assembly 20 for that rope should be inhibited from spraying. Preferably, reflective optical sensors will be provided for each rope of food product 26.

As a further enhancement, the controller 36, shown in FIG. 1, can be connected to the quick release couplings, can monitor and vary the speed of the extruder(s), and/or the forming device 44.

The opening and closing of the solenoid valve 34 is preferably as short as possible to ensure sharp definition in the printing or inking process. It is contemplated that the spraying of the edible ink through the nozzle assembly 20 will be accomplished in rapid intermittent cycles to create the appearance of stripes on the cereal piece. It is further contemplated that the opening and closing times of the valve 34 should be adjustable and random to produce interesting random patterns of stripes on the food product 26, for example. The patterns and stripes may also be repeated. The valve 34 can be timed or synchronized with the frequency of motion associated with the forming device 44, such as crimping, so that the spraying and crimping is accomplished in a synchronized manner.

Referring again to FIGS. 2-4, a support 100 accurately and securely locates the nozzle assembly 20 relative to the extruder ports 46 and ropes of extruded food product 26. Further, this support 100 may allow users to lift the nozzle assembly 20 away from the ropes of the extruded food product 26 when starting or stopping the extrusion process.

As mentioned above, there may be any number of nozzle assemblies similar to nozzle assembly 20 would preferably form any number of channels to accommodate any number of extruder ports. As also mentioned above, the nozzle assembly 20 could be manufactured and assembled separately such that if a repair is necessary for one nozzle assembly other nozzle assemblies would not be affected. In other words, a user could remove a single malfunctioning nozzle assembly without disturbing the adjacent nozzle assemblies.

The invention has been described in the illustrative manner, and it is to be understood that the terminology which has been used is intended to be in the nature of words of description rather than of limitation. It is now apparent to those skilled in the art that many modifications and variations of the present invention are possible in light of the above teachings. It is, therefore, to be understood that the invention may be practiced otherwise than specifically described.

What is claimed is:

1. A method for spraying a food product comprising the steps of:
   providing a channel being defined by a periphery and being open to surround an axis defining, at least in part, a linear path of movement for a food product through the channel;
   disposing a first sprayer adjacent the periphery of the channel and along the axis;
   disposing a second sprayer adjacent the periphery of the channel and along the axis axially and radially spaced from the first sprayer;
   positioning the first and second sprayers relative to the linear movement of the food product along the axis such that the first and second sprayers do not move relative to the linear movement of the food product along the axis;
   directly communicating with the first and second sprayers disposed along the axis with a cavity operable to receive edible ink such that the first and second sprayers concurrently spray the edible ink to the axis;
   extending a fluid line between a first end for receiving edible ink and a second end communication with the cavity;
   disposing a solenoid valve along the fluid line operable in open and closed configurations to selectively open the fluid line; and
   spraying the edible ink through the first and second sprayer in rapid intermittent cycles by controlling the solenoid with a controller operable to control the solenoid valve to intermittently change between open and closed configurations.

2. The method of claim 1 further comprising the steps of:
   directing the first sprayer at a first position along the axis; and
   directing the second sprayer at a second position along the axis spaced from the first position.

3. The method of claim 2 further comprising the steps of:
   disposing a third sprayer along the axis axially aligned with and radially spaced from the first sprayer;
   disposing a fourth sprayer along the axis axially aligned and radially spaced from the second sprayer; and
   directly communicating with the third and fourth sprayers disposed along the axis with the cavity such that the first and second and third and fourth sprayers concurrently spray the edible ink to the axis.

4. The method of claim 3 further comprising the steps of:
   directing the third sprayer at the first position along the axis; and
   directing the fourth sprayer at the second position along the axis.

5. The method of claim 4 further comprising the steps of:
   moving a food product along the axis at a rate; and
   directing edible ink to the cavity to spray the food product moving along the axis.

6. The method of claim 1 further comprising the step of:
   controlling the solenoid valve to change between the open and closed configurations at variable rate while maintaining the rate of movement of the food product along the axis.

7. The method of claim 1 further comprising the steps of:
   controlling the solenoid valve to be in the open configuration for different time periods while maintaining the rate of movement of the food product along the axis.

8. The method of claim 1 further comprising the steps of:
   controlling the solenoid valve to be in the closed configuration for different time periods while maintaining the rate of movement of the food product along the axis.

9. A method for spraying a food product comprising the steps of:
   providing a channel being defined by a periphery and being open to surround an axis defining, at least in part, a linear path of movement for a food product through the channel;
   disposing a first sprayer adjacent the periphery of the channel and along the axis;
   disposing a second sprayer adjacent the periphery of the channel and along the axis axially and radially spaced from the first sprayer;
   disposing a third sprayer adjacent the periphery of the channel and along the axis axially aligned with and radially spaced from the first sprayer;
   disposing a fourth sprayer adjacent the periphery of the channel and along the axis axially aligned and radially spaced from the second sprayer;
   positioning the first and second and third and fourth sprayers relative to the linear movement of the food product along the axis such that the first and second and third and fourth sprayers do not move relative to the linear movement of the food product along the axis;
   directly communicating with the first and second and third and fourth sprayers disposed along the axis with a cavity operable to receive edible ink such that the first and second and third and fourth sprayers concurrently spray the edible ink to the axis;
   moving the food product along the axis and through the channel;
   extending a fluid line between a first end for receiving edible ink and a second end communication with the cavity;
   disposing a solenoid valve along the fluid line operable in open and closed configurations to selectively open the fluid line; and
   spraying the edible ink through the first and second and third and fourth sprayer in rapid intermittent cycles by controlling the solenoid with a controller operable to control the solenoid valve to intermittently change between open and closed configurations.

10. The method of claim 9 further comprising the step of:
    coordinating a rate of movement of the food product along the axis with the variable rate the solenoid valve is shifted between the open and closed configurations.

11. The method of claim 9 wherein said moving step is further defined as:
    moving a food product along the axis independent of the variable rate the solenoid valve is shifted between the open and closed configurations.

12. The method of claim 9 wherein said controlling step is further defined as:
    controlling the solenoid valve to shift between the open and closed configurations at variable rate to produce markings on the food product of different widths.

13. The method of claim 9 wherein said controlling step is further defined as:
    controlling the solenoid valve to shift between the open and closed configurations at variable rate to produce markings on the food product spaced different distances apart.

14. The method of claim 9 wherein said controlling step is further defined as:
    controlling the solenoid valve to shift between the open and closed configurations at variable rate to produce differently shaped markings on the food product.

15. The method of claim 9 wherein said controlling step is further defined as:

controlling the solenoid valve to shift between the open and closed configurations at variable rate to produce stripes of different widths on the food product.

16. The method of claim 9 wherein said controlling step is further defined as:
controlling the solenoid valve to shift between the open and closed configurations at variable rate to produce non-uniformly spaced stripes on the food product.

17. A method for spraying a food product comprising the steps of:
providing a channel being defined by a periphery and being open to surround an axis defining, at least in part, a linear path of movement for a food product through the channel;
disposing a first sprayer adjacent the periphery of the channel and along the axis;
disposing a second sprayer adjacent the periphery of the channel and along the axis axially and radially spaced from the first sprayer;
positioning the first and second sprayers relative to the linear movement of the food product along the axis such that the first and second sprayers do not move relative to the linear movement of the food product along the axis;
directly communicating with the first and second sprayers disposed along the axis with a cavity operable to receive edible ink such that the first and second sprayers concurrently spray the edible ink to the axis;
moving the food product along the axis and through the channel;
disposing a quantity of edible ink in a tank;
disposing a valve operable in open and closed configurations between the tank and the cavity to selectively direct edible ink to the cavity and thereafter through the first and second sprayers; and
spraying the edible ink through the first and second sprayer in rapid intermittent cycles by controlling the valve with a controller operable to control the valve to intermittently change between open and closed configurations.

18. The method of claim 17 further comprising the step of:
disposing a third sprayer along the axis axially aligned with and radially spaced from the first sprayer; and
directing both the first and third sprayers at a first point along the axis such that the first and third sprayers cooperate to produce markings on the food product in the form of stripes.

19. The method of claim 18 further comprising the step of:
disposing a fourth sprayer along the axis axially aligned and radially spaced from the second sprayer; and
directing both the second and fourth sprayers at a second point along the axis spaced from the first point such that the second and fourth sprayers cooperate to produce markings on the food product in the form of stripes.

\* \* \* \* \*